E. B. COOK.
MACHINE FOR WASHING EGGS.
APPLICATION FILED JULY 5, 1911.

1,081,367.

Patented Dec. 16, 1913.

2 SHEETS—SHEET 1.

Witnesses

Elmer B. Cook,
Inventor by C.A. Snow & Co.
Attorneys

E. B. COOK.
MACHINE FOR WASHING EGGS.
APPLICATION FILED JULY 5, 1911.

1,081,367.

Patented Dec. 16, 1913.
2 SHEETS—SHEET 2.

Elmer B. Cook,
Inventor

Witnesses by C. A. Snow & Co.
Attorneys.

UNITED STATES PATENT OFFICE.

ELMER B. COOK, OF GILROY, CALIFORNIA.

MACHINE FOR WASHING EGGS.

1,081,367.  Specification of Letters Patent.  Patented Dec. 16, 1913.

Application filed July 5, 1911. Serial No. 636,886.

*To all whom it may concern:*

Be it known that I, ELMER B. COOK, a citizen of the United States, residing at Gilroy, in the county of Santa Clara and State of California, have invented a new and useful Machine for Washing Eggs, of which the following is a specification.

This invention relates to machines for washing and drying eggs, its object being to provide a series of revoluble scrubbing elements movable in unison, means being employed for feeding eggs to said elements whereby the outer surfaces thereof are thoroughly cleaned, after which the eggs are discharged into a receiver provided therefor.

A further object is to provide a machine of this type the scrubbing elements of which constitute means for conveying the eggs from the inlet to the outlet of the machine.

Another object is to provide a machine of this character which is simple in construction, will not readily get out of order, and will operate efficiently to clean the eggs supplied to it.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

Figure 1:
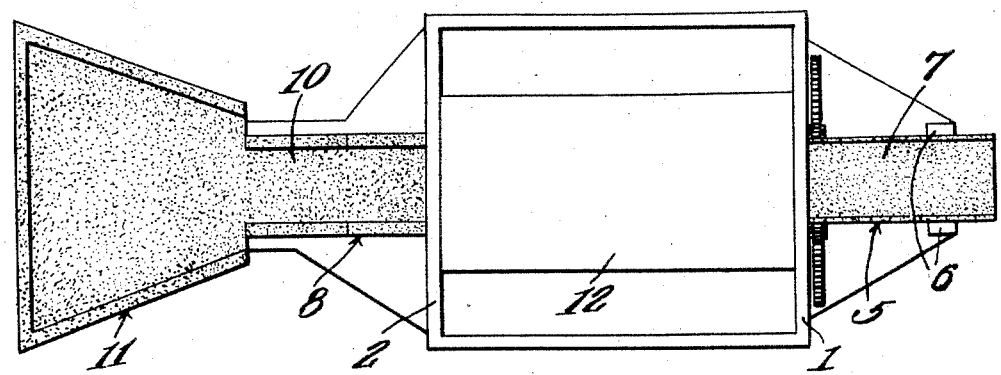
Figure 2:
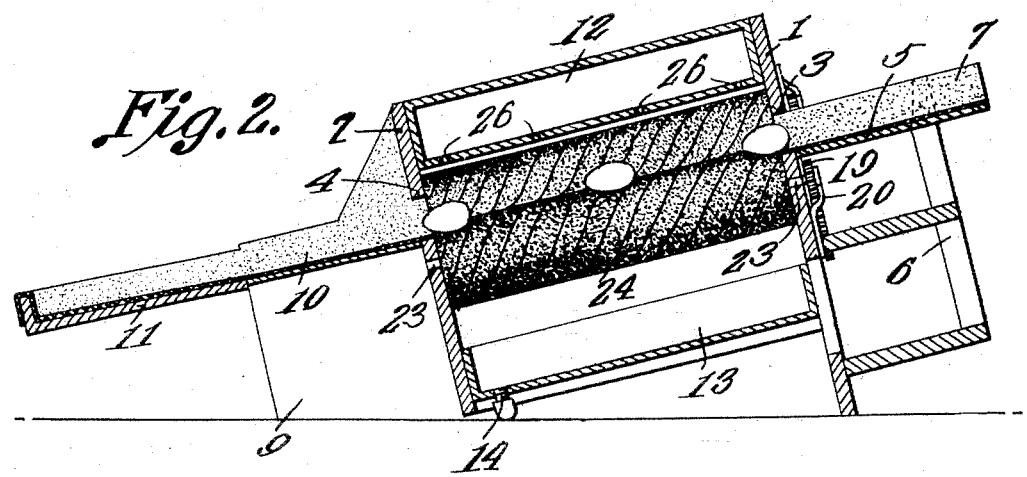
Figure 3:
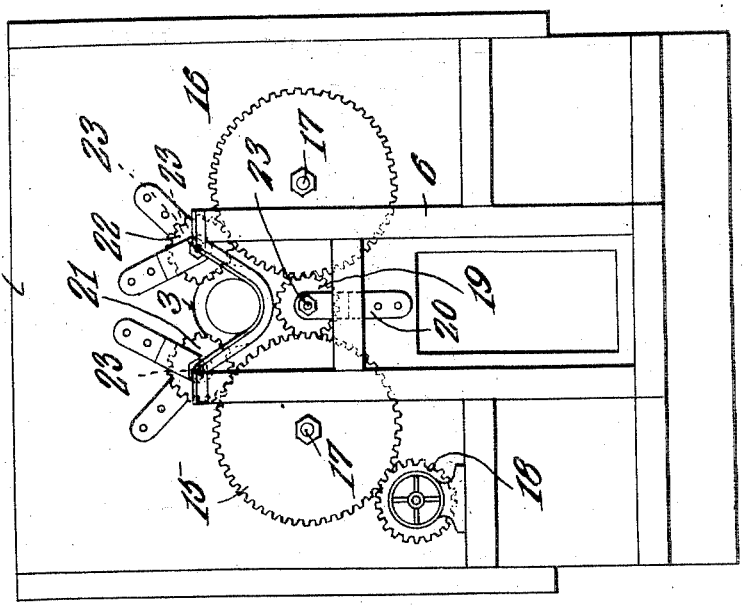
Figure 4:
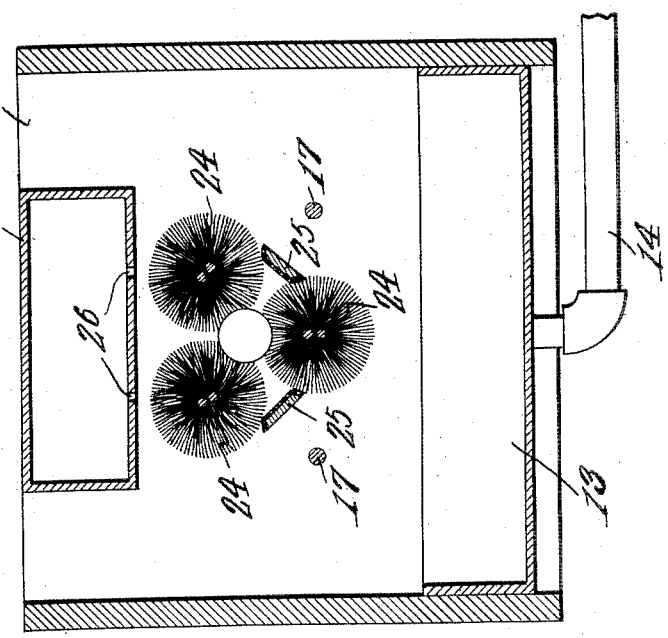

In said drawings—Figure 1 is a plan view of the machine. Fig. 2 is a central longitudinal section therethrough. Fig. 3 is an end elevation on an enlarged scale. Fig. 4 is a transverse section through the machine.

Referring to the figures by characters of reference 1 and 2 designate upstanding supporting members, the member 1 having an egg receiving opening 3 therein, while the member 2 has an egg delivery opening 4. These elements 1 and 2 are preferably inclined but parallel and a feed trough 5 extends to the opening 3 and is mounted on a suitable supporting structure 6, said trough being lined with felt or any other suitable soft material such as indicated at 7. Another trough 8 extends from the discharge opening 4 and is mounted on a suitable supporting structure 9, said delivery trough being lined with felt or other suitable soft material such as indicated at 10 and delivering into a tray 11 similarly lined and into which the eggs are discharged after being thoroughly washed and cleaned.

A tank 12 is supported between the members 1 and 2 at the upper ends thereof and a receiving tray 13 is supported between the lower ends of said members and has an outlet pipe 14 or the like extending from the lower portion thereof.

Spaced gears 15 and 16 are journaled upon the member 1, said gears being preferably mounted on rods 17 extending longitudinally through the machine. One of these gears may be engaged by another gear 18 driven by a motor or the like it being understood that any suitable means may be employed for operating the mechanism.
A gear 19 is mounted on a bracket 20 interposed between the gears 15 and 16 and this gear 19 meshes with both of said gears 15 and 16 and constitutes means for transmitting motion from one to the other. Gear 15 furthermore meshes with a gear 21 and gear 16 meshes with a gear 22, the gears 19, 21 and 22 being of the same size and adapted to rotate in the same direction and at the same speed. These gears are equidistant and are secured to the ends of shafts 23 on which brushes 24 are secured. These brushes extend from the member 1 to the member 2 and are all parallel, each brush having its tufts of bristles arranged spirally.
The egg receiving space formed between the three parallel brushes extends from the opening 3 to the opening 4 but the transverse area of this space is slightly less than the diameter of the smallest egg to be cleaned.

Retaining or guide strips 25 are extended between the members 1 and 2 and parallel with and between the lower brush 24 and each of the other two brushes as indicated in Fig. 4. These strips are preferably covered with felt or other suitable soft material and constitute means for preventing eggs from escaping downwardly between the lower brush and either of the upper brushes.
When it is desired to use the machine, the tank 12 is supplied with water, it being understood that the bottom of this tank has a desired number of minute outlet openings 26. The gears are then rotated by means of the motor provided for that purpose and eggs to be washed are then placed in the trough 5. These eggs will slide downwardly by gravity into and through the opening 3 and then between the rotary brushes 24. These brushes all revolve in the same direction and as the tufts of bristles are disposed spirally, it will be obvious that said tufts, as they rub upon the egg, will also shift it longitudinally toward the opening 4, this movement being facilitated by force of gravity for the reason that the brushes are inclined downwardly toward the opening 4. Water being supplied to the brushes it will be obvious that the eggs will be thoroughly cleaned as they pass between the brushes and will be discharged through the opening 4 and into trough 8 which, in turn, directs them into the receiving tray 11.

It is desirable to soak the eggs for a short time in water before placing them in the trough 5 so as to thus facilitate the removal of dirt from them when the eggs are fed to the brushes.

What is claimed is:—

A machine for cleaning eggs including an inclined revoluble brush, parallel inclined upper brushes adjacent the first named brush, the space between the upper brushes being in vertical alinement with the axis of the lower brush and having its end unobstructed, said upper and lower brushes coöperating to hold an egg normally supported between the brushes, means for directing eggs into the unobstructed receiving end of said space, and means for receiving eggs from the unobstructed delivery end of said space, and downwardly converging oppositely disposed similar retaining strips contacting with opposed portions of the first named brush and with the lower portions of the upper brushes.

In testimony that I claim the foregoing as my own, I have hereto affixed my signature in the presence of two witnesses.

ELMER B. COOK.

Witnesses:
 FRANK P. WOODS,
 CHAS. A. COOK.